Feb. 3, 1953 — R. R. HAYES — 2,627,582
ELECTRIC MOTOR FRAME HAVING COOLANT SYSTEM INCORPORATED THEREIN
Filed July 2, 1949 — 2 SHEETS—SHEET 2

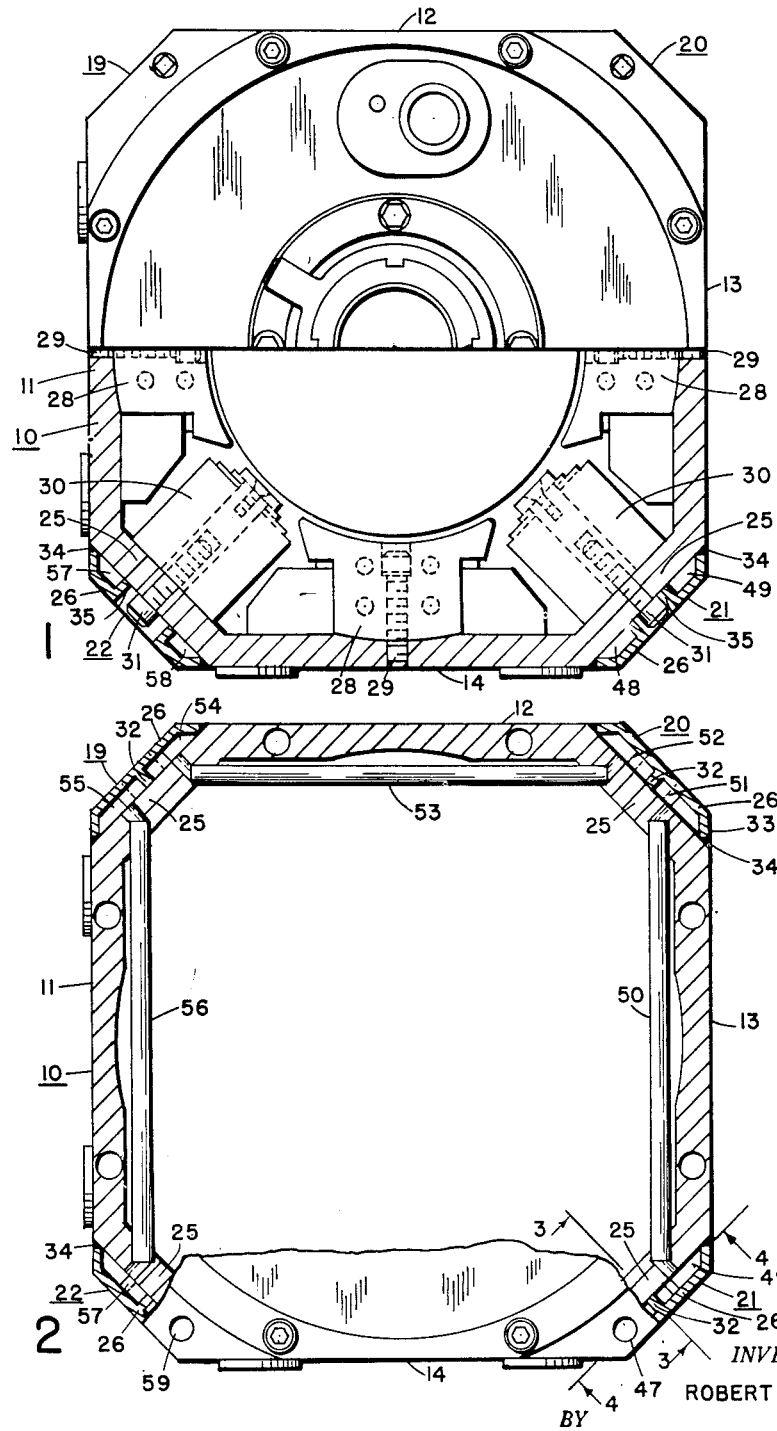

*INVENTOR.*
ROBERT R. HAYES
BY
Hoodling and Krost
attys.

Patented Feb. 3, 1953

2,627,582

UNITED STATES PATENT OFFICE 2,627,582

ELECTRIC MOTOR FRAME HAVING COOLANT SYSTEM INCORPORATED THEREIN

Robert R. Hayes, Cleveland, Ohio, assignor to The Reliance Electric & Engineering Co., a corporation of Ohio Application July 2, 1949, Serial No. 102,806

9 Claims. (Cl. 310—54)

This invention relates to frames for electric motors, and more particularly to frames for electric motors having incorporated therein a coolant system.

An object of the invention is the provision of a coolant system incorporated in the frame of an electric motor so that the entire motor frame does not occupy more square space than a motor without the coolant system.

Another object of the invention is the provision of incorporating a coolant chamber or jacket in the corner of the motor frame and in intimate contact with the magnetic section of the frame.

Another object of the invention is to cool the magnetic section of the motor frame at places where the poles are anchored to the magnetic section, in order to provide maximum conduction of heat from the poles and the coils surrounding the same.

Another object of the invention is to provide for cooling the interpoles of the motor.

Another object of the invention is to increase the rating of the motor over a machine which is not provided with a coolant system, the invention being particularly adaptable to explosion-proof motors.

Another object of the invention is to cool the corners of the motor frame to which the interpoles are connected, whereby the entire motor frame does not occupy substantially any more square space than a motor without the coolant system.

Other objects and a fuller understanding of the invention may be had by referring to the following description and claims, taken in conjunction with the accompanying drawings, in which:

Figure 1 is an end view of a motor frame embodying the features of the present invention, the lower half of the machine being shown in section to better illustrate the parts;

Figure 2 is a view similar to Figure 1, but with the poles removed and with substantially all of the end cover plate removed except the lower part, the drawing showing principally the construction of the coolant system;

Figure 3:
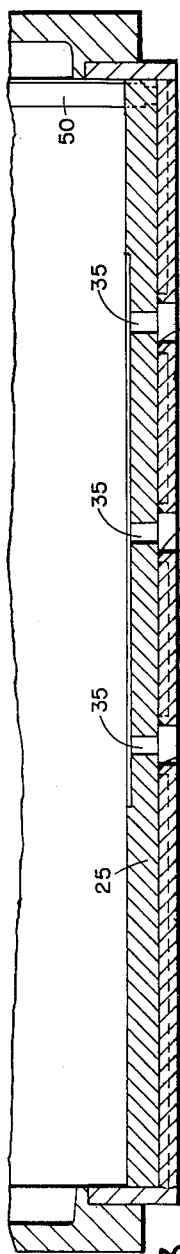
Figure 3 is a fragmentary cross-sectional view taken along the line 3—3 of Figure 2.

With reference to the drawings, and particularly to Figures 1 and 2, the complete motor frame is illustrated generally by the reference character 10, and comprises in its preferred form four main or large side portions 11, 12, 13 and 14 and four small side or corner structures 19, 20, 21 and 22. As illustrated, main poles indicated by the reference character 28 are fastened to the main or large side portions respectively. Any suitable means may be employed to fasten the main poles 28 to the main or large side portions, and as illustrated a threaded bolt 29 is employed.

The small side or corner structures comprise side or corner portions 25 which form an integral part of the magnetic structure together with the main or large side portions. In other words, the side or corner portions 25 and the main or large side portions are alternately arranged to form a substantial octagonal closed magnetic structure for the motor. Mounted over each of the side or corner portions 25 is a cover plate illustrated by the reference character 26, which cover plate in cooperation with the corner portion 25 defines a hollow passageway for the coolant. Connected to the inside of each of the corner portions 25 of the magnetic structure is an interpole designated generally by the reference character 30. The interpole may be connected to the inside of the corner portion 25 by any suitable means, and as illustrated by the drawing a connecting bolt 31 is employed.

Figure 4:
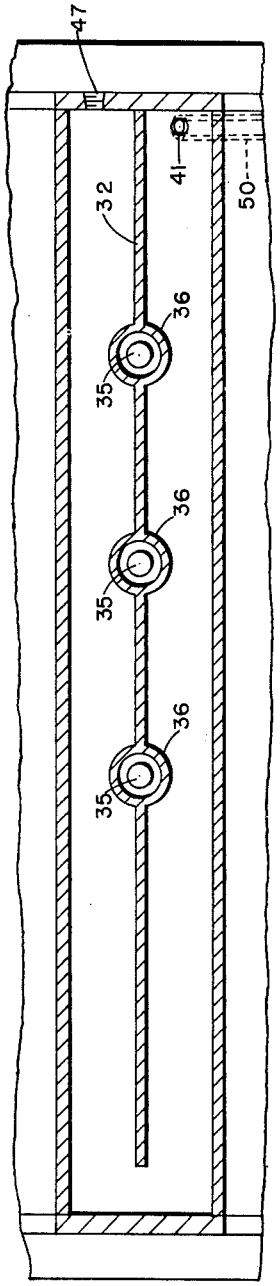
Figure 4 is a fragmentary cross-sectional view taken along the line 4—4 of Figure 2.
Figure 5:
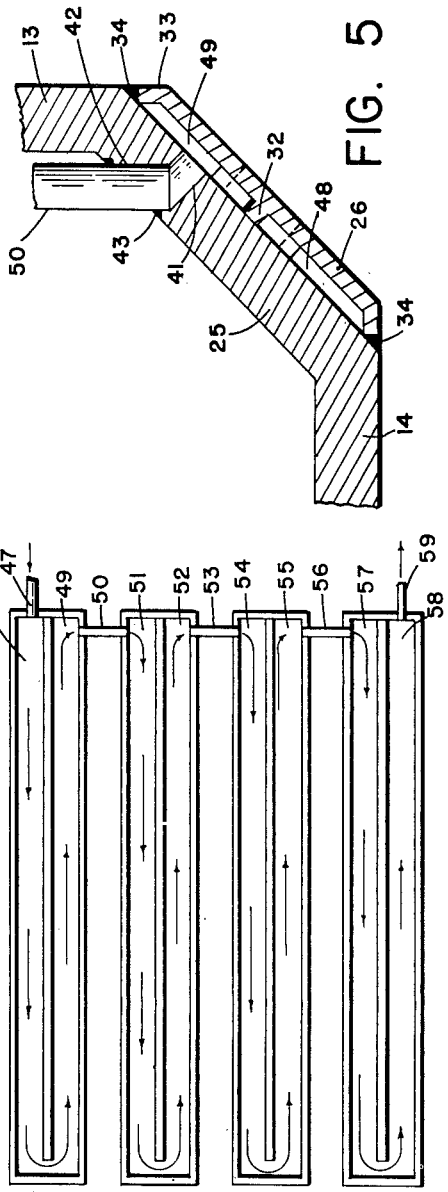
Figure 5 is an enlarged view of the lower right-hand corner of the frame shown in Figures 1 and 2.
Figure 6:
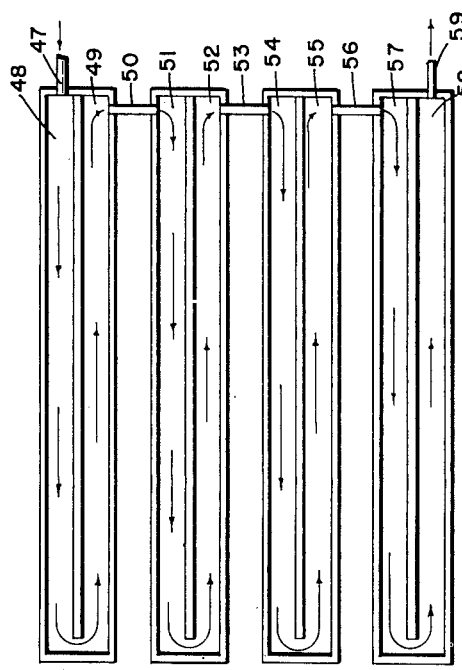
Figure 6 is a diagrammatic illustration of the path of the coolant in the coolant system which is incorporated in the motor frame.

The cover plate 26 may be provided with a longitudinal extending rib or dividing partition 32 so as to provide two paths for the coolant to flow; see the diagrammatic arrangement shown in Figure 6. The dividing partition or rib 32 has circular ribs 36 surrounding the opening 35, through which the bolts 31 pass that hold the interpoles to the inside surface of the corner portion 25 of the magnetic frame. The circular ribs 36 are particularly shown in Figure 4. The ribs may be welded to the outside surface of the corner portion 25, such as illustrated by the welding sections 37 of Figure 3. In other words, the coolant passageways are leak-proof with respect to the openings 35 through which the bolts 31 extend for holding the interpoles to the inside surface of the corner portions 25. The ends of the cover plates 26 have beveled sides 33, and the ends thereof are arranged to rest against the outside surface of the corner portions 25. As illustrated in the drawings, the ends of the cover plates may be welded at 34 to the outside surface of the corner portions 25. Thus the entire coolant structure for each of the corners of the motor frame comprises the side or corner portion of the magnetic frame plus the cover plate 26.

The inlet for the coolant system is illustrated by the reference character 47 and comprises a tapered or threaded opening whereby the motor may be connected to a supply of coolant, such, for example, as a supply of circulating water. The coolant, upon entering the coolant system, passes through a coolant path 48 which extends substantially the entire length of the motor, and then the coolant flows in a return path 49, from which the coolant then flows through a connecting conduit 50 which carries the coolant to the next adjacent corner, being the upper right-hand corner shown in Figures 1 and 2. Here the coolant passes first through a coolant path 51 and then back through a coolant path 52, whereupon the coolant flows through a connecting conduit 53 which carries the coolant to the coolant structure in the upper left-hand corner of the motor frame shown in Figures 1 and 2. Here the coolant passes through a path 54 and then back again through a path 55, where it then flows through a connecting conduit 56 which carries the coolant to the lower left-hand corner as shown in Figures 1 and 2. The coolant, upon flowing through the coolant structure in the lower left-hand corner, first passes through a path 57 and then back through a path 58 to the outlet illustrated by the reference character 59.

While the invention shows the coolant structures connected in series, it is to be understood that the several paths may be connected in parallel or in a series combination parallel arrangement. The connecting conduits 50, 53 and 56 may be connected to the respective coolant paths in any suitable manner, such as by the employment of pipe or tube connectors, or by welding the connecting conduit directly in the frame. In its preferred form, the invention shows welding of the connecting pipes in the frame, and such a welded connection may be accomplished by first providing a hole 41 in direct communication with the passageway and then providing an angularly disposed hole 42 in which the end of the tube may be inserted by bending the tube to foreshorten same so as to enter the holes 42, after which the connecting tube may be straightened to extend the ends of the tube into the opening 42. The ends of the tube may be welded to the inside surface of the frame as illustrated by the reference character 43. The coolant, or water, upon passing through the coolant system keeps the corners of the motor frame cool, and particularly keeps the interpoles cool, which would run at a higher operating temperature than the main poles. The circulation of the coolant or water through the corner passageways also removes heat from the main or large side portions to which the main poles are connected, and thus tends to keep the main poles operating at a lower temperature than they would normally operate in the absence of the cooling system. Thus, the entire rating of the motor is greater than it would be in the absence of the cooling system.

It is to be further noted that the incorporation of the coolant system in the motor frame does not occupy substantially any more space than that of a motor without the cooling system, since the addition of the cover plates 26 occupies very little space. In addition to keeping the space to a minimum, the coolant system is located so as to provide excellent conduction of heat from the interpoles which would normally operate at a higher temperature than the main poles. This coolant system may be incorporated in motors of all types, and is particularly adaptable to explosion-proof motors where the operating temperature is preferably maintained at a low minimum to provide increased efficiency.

The term "electric motor," as employed herein, is used in a generic sense and includes any type of a dynamoelectric machine, including generators as well as motors.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An electric motor frame comprising a magnetic structure having at least four large side structures and at least four small side structures alternately arranged to form a substantially octagonal cross-section, said large side structures supporting respectively a main pole and said small side structures supporting respectively an interpole, each said small side structures having a hollow passageway therein and defining a coolant path, and conduit means interconnecting said passageways to establish a coolant system for said frame.

2. An electric motor frame comprising a magnetic structure and having at least four large side portions and at least four small side portions alternately arranged to form a substantially octagonal cross-section, said large side portions supporting respectively a main pole and said small side portions supporting respectively an interpole, cover means for each said small side portion and defining therewith a hollow passageway, and conduit means interconnecting said passageways to establish a coolant system for said frame.

3. An electric motor frame comprising a magnetic structure having first side structures of one size and second side structures of another size, said first and second side structures being alternately arranged to form a substantially octagonal cross-section, said first side structure supporting respectively a pole of one size and said second side structures supporting respectively a pole of another size, each said second side structures having a hollow passageway therein and defining a coolant structure, and conduit means interconnecting said passageways to establish a coolant system for said frame.

4. An electric motor frame having at least side portions respectively supporting an interpole, cover means for each of said side portions and defining therewith a hollow passageway, and conduit means for interconnecting said passageways to establish a coolant system for said frame, said passageways each having a longitudinal partition dividing same to form at least two coolant paths therein.

5. A fluid-cooled frame for a dynamoelectric machine having main poles and interpoles, said frame having a plurality of large side portions and an equal plurality of small side portions alternately arranged to form a frame of polygonal cross section, each of said large side portions carrying one of said main poles and each of said small side portions carrying one of said interpoles, a cover plate covering each of one of said types of side portions to form therewith a coolant passage, conduits disposed at one end of said frame to connect said passages in series, and entry and discharge ports connected to the ends of said serially connected coolant passages at one end of said frame.

6. A fluid-cooled frame for a dynamoelectric machine having main poles and interpoles, said frame having four large side portions and four small side portions alternately arranged to form a frame of octagonal cross section, each of said large side portions carrying one of said main poles and each of said small side portions carrying one of said interpoles, a cover plate covering each of said small side portions to form therewith a coolant passage, conduits disposed at one end of said frame to connect said passages in series, and entry and discharge ports connected to the ends of said serially connected coolant passages at said one end of said frame.

7. A water-cooled frame for a dynamoelectric machine having main poles and interpoles, said frame having four large side portions and four small side portions alternately arranged to form a frame of octagonal cross section, each of said large side portions carrying internally one of said main poles and each of said small side portions carrying internally one of said interpoles, a cover plate externally covering each of said small side portions to form therewith a coolant passage, a longitudinal rib extending lengthwise of and substantially in the center of each of said coolant passages to divide same into first and second coolant ducts serially connected at a first end of said frame, conduits disposed within a second end of said frame to connect said ducts in series, and entry and discharge ports connected to the ends of said serially connected coolant ducts at said frame second end.

8. A water-cooled frame for an electric motor having shunt excited main poles and series excited interpoles which under heavy load will have a greater temperature rise than said main poles, said frame having four large side portions and four small side portions alternately arranged to form a frame of octagonal cross section, each of said large side portions carrying internally one of said main poles and each of said small side portions carrying internally one of said interpoles, a cover plate externally covering each of said small side portions to form therewith a coolant passage, a longitudinal rib extending lengthwise of and substantially in the center of each of said coolant passages to divide same into first and second coolant ducts serially connected at a first end of said frame, conduits disposed within a second end of said frame to connect said ducts in series, and entry and discharge ports connected to the ends of said serially connected coolant ducts at said frame second end.

9. An electric motor annular frame having at least side portions, a plurality of interpoles each having a core with a root, each side portion respectively supporting an interpole at the root of the core, cover means for each of said side portions and defining therewith a hollow passageway undermining each root, and conduit means for interconnecting said passageways to establish a coolant system for said frame.

ROBERT R. HAYES.

REFERENCES CITED

The following references are of record in the file of this patent:

UNITED STATES PATENTS

| Number | Name | Date |
|---|---|---|
| 1,123,319 | Kunkel | Jan. 5, 1915 |

FOREIGN PATENTS

| Number | Country | Date |
|---|---|---|
| 296,301 | Germany | Jan. 31, 1917 |
| 433,209 | Germany | Aug. 24, 1926 |